Nov. 24, 1964 W. R. DICKIE 3,157,893
METHOD FOR MAKING A HEADED FASTENER
Filed June 29, 1959
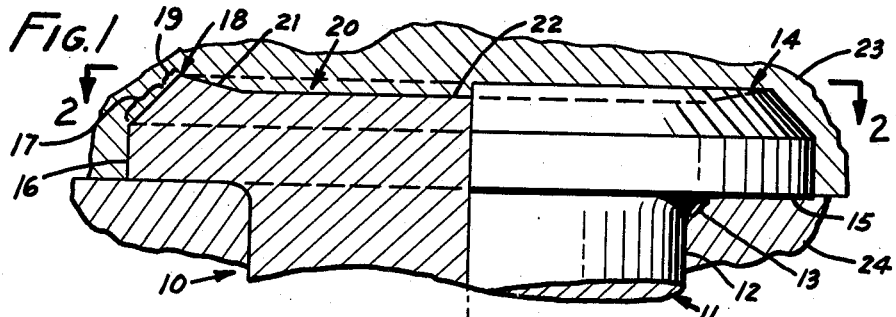
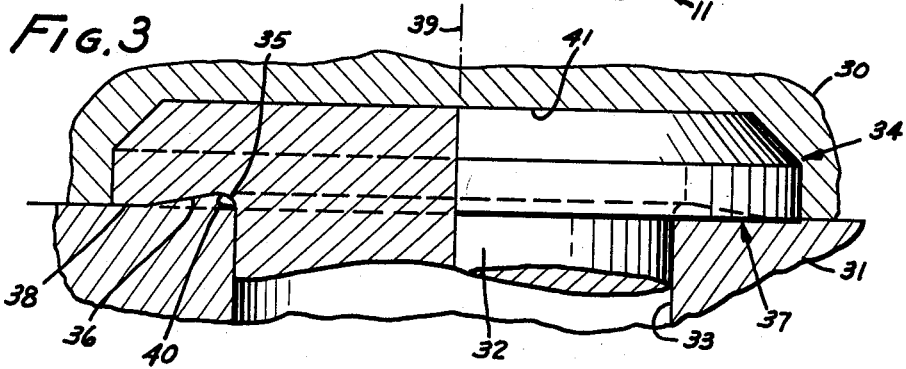
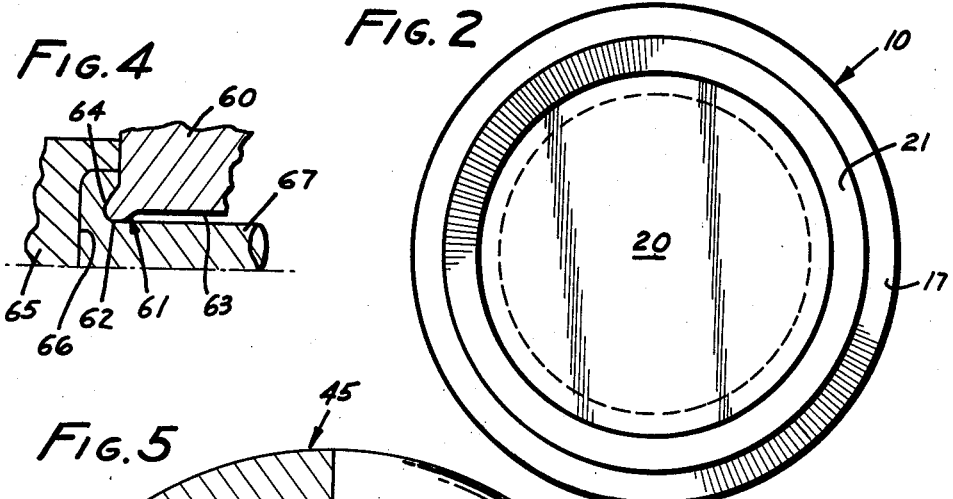
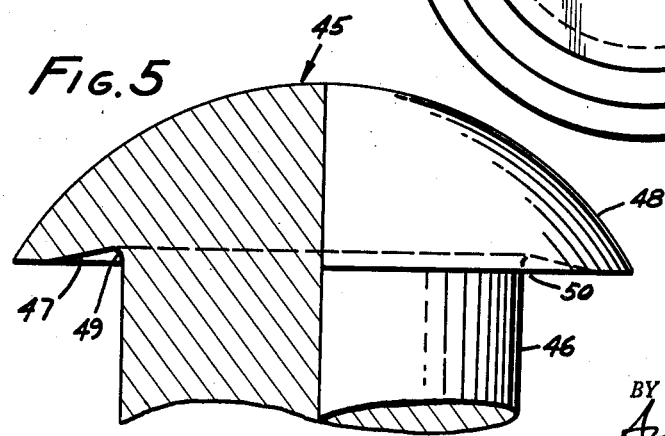
INVENTOR.
WILLIAM R. DICKIE
BY
ATTORNEYS.

3,157,893
METHOD FOR MAKING A HEADED FASTENER
William R. Dickie, Manhattan Beach, Calif., assignor to Hi-Shear Rivet Tool Company, Torrance, Calif., a corporation of California
Filed June 29, 1959, Ser. No. 823,539
1 Claim. (Cl. 10—27)

This invention relates to a method for making headed fasteners.

The widely-used "umbrella" head for head-shank type fasteners is well known. This type of head is integral with a shank, such as that of a bolt or rivet, and has as its identifying characteristic a face adjacent to the shank which is recessed, so that a portion of this face overhang a portion of the shank. When a fastener with an umbrella head is set or otherwise tightened down, the edge of the overhanging face tends to bear against the adjacent material (or even itself deform, or indent the material slightly), so as to provide a complete contact with the material around the entire periphery of the head.

A disadvantage of the umbrella head-type fastener resides in the fact that heretofore the shank could not be produced to an accurately sized diameter. This is because if means such as grinding, for example, are used to reduce the shank to an accurate size, it is not possible to grind the shank all the way up to the adjacent face on the head, because the face overhangs a portion of the shank and would prevent the grinder from grinding the shank all the way to the head. Were grinding to be performed on such a shank, there would result a small step on the shank located where the face of the head overhangs the shank. Such a step would form a point for stress concentration which would tend to make the fastener less reliable, particularly with respect to fatigue.

It is an object of this invention to provide a process of manufacturing umbrella headed fasteners, whereby an accurately dimensioned shank of uniform diameter along its entire length can be provided. At the present time, it is not possible to produce umbrella head fasteners with accurately manufactured diameters over the entire length of their shanks, due to the above limitation. The process of this invention removes that limitation.

This invention is carried out in a three-step process in which a first step includes the formation of a unitary member having a shank and a head, the head having a face adjacent to the shank which does not overhang the shank. The second step comprises a reduction in diameter of the shank to a desired diameter. The third step comprises reheading the member so as to displace a portion of the material of the head so that it overhangs a portion of the shank.

The invention will be fully understood from the following detailed description and the accompanying drawings, in which:

FIG. 1 is an elevation, partly in cutaway cross-section, which illustrates an intermediate configuration of a fastener being manufactured by a process according to the invention;

FIG. 2 is a top view of the intermediate configuration taken at line 2—2 of FIG. 1;

FIG. 3 is a side elevation, partly in cutaway cross-section, showing the final step of the process and the resulting fastener;

FIG. 4 shows an alternate process for converting the intermediate configuration to the desired final shape; and FIG. 5 shows an umbrella head according to the prior art.

FIG. 1 illustrates the first step in a process according to the invention. An intermediate configuration 10 of a fastener is shown which is the product of the first step. In the first step, which may involve such techniques as heading or turning, a blank is produced which includes a shank 11 having a cylindrical portion 12 and a fillet 13. The configuration includes a head 14 with a face 15 adjacent to the shank, which intersects the fillet. Throughout this specification the fillet from its tangent to the cylindrical portion of the shank, to its tangent with the face, will be considered and defined as part of the shank. Face 15 does not overhang any portion of shank 11. The head has a cylindrical outer surface 16 and a frusto-conical outer surface 17. The frusto-conical portion has an integral ring 18 of metal atop it. The ring includes an outer surface 19 which forms a continuation of surface 17, and a central dished section 20 which includes an interior conical frustum 21 and a flat bottom 22. This intermediate configuration is most conveniently formed in a header between die parts 23, 24.

The shank of the intermediate configuration 10 is next reduced in a second step to an accurate dimension. Means for carrying out this reduction are too well known to require detailed illustration here. They comprehend such steps as grinding, lathe turning, extrusion, and the like. The term "turning" is used herein to define the presently preferred technique for the second step. "Turning" means any technique for reducing the diameter of the shank to a desired size by actions carried out by relative rotation of the shank and means for reducing the shank. These may or may not involve a cutting action in the sense of material removal by chips or grindings. The term "turning" therefore includes, but is not limited to, cutting and abrading.

In the grinding step which is an example of a "turning" process, the grinder is preferably run right up to the face of the head, so that it grinds both the cylindrical part of the shank and the fillet part of the shank. The member produced is substantially identical in appearance to that shown in FIG. 1, because by this process a new fillet is ground which fairs into both the cylindrical part of the shank and the face. This avoids the creation of a step anywhere on the member. Steps are deleterious in a set fastener, because they constitute locations where stress forces concentrate, and this may lead to fastener failure. An advantage of the present process is its ability to provide an accurately sized cylindrical shank part without the formation of any steps.

The intermediate stage 10 with the accurately ground diameter is transferred to a pair of die parts 30, 31 where, in a third step, it is reheaded. The shank 32 as shown is shank 11 reduced to the desired diameter in the second step. The cylindrical portion of the shank is placed in an opening 33 in die part 31 with its head above the die part. The other die part 30 is brought down on the head to form head 34.

It will be noted that die part 31 includes a raised segment 35 immediately adjacent opening 33 which forms an umbrella-type relief 36 in face 37 adjacent to shank 32. Face 37 includes the umbrella relief, and an outer annular face section 38. Both the relief and section 38 are concentric around central axis 39. Face 37 axially overhangs at least a part of shank 32. It will be noted that fillet 40 which interconnects the umbrella relief with the shank is a smooth transitional curve, and that there is no step where the cylindrical shank portion and the fillet intersect, nor where the fillet and face intersect.

Die part 30 has a flat bottom 41 which, when brought down against the head of the intermediate stage, produces a flat-topped head. The flat top is formed by displacing material downwardly which simultaneously forms the umbrella relief. The volume of the ring is selected to be substantially equal to the volume of the head which is displaced axially from some datum plane in the head; that is, the volume of the head remains substantially constant, while its material is redistributed. It will be recognized that in order to get the die parts in the reheading operation to fit over the intermediate member, it is necessary for there to be certain clearance dimensions, and therefore, the volume of the ring and the volume of the part of the member which is displaced axially will be substantially, but not exactly, equal.

The product produced in FIG. 3 has an umbrella head and cylindrical shank of accurate diameter even at those locations which are overhung by face 37. The shank may be provided with threads, if desired, or it may be left unthreaded to serve as the shank of a rivet. The application of the fastener is of no importance to the invention; the invention resides in the process for making the combination of a shank held to close tolerances over its entire length, and an umbrella head. There are no stress concentration points along or adjacent to the shank, and this invention has therefore overcome the limitations of the prior art.

An alternate means for carrying out the second and third steps is shown in FIG. 4. This is a combination of a reduction of shank diameter by an extrusion process accomplished by forcing the shank through a first die part which is an extrusion die, and a reheading operation accomplished by striking the head with another die part, preferably while the shank is still in the first die part.

A first die part 60 includes a throat 61 which has a constricted section 62 which determines the size of the shank. A relieved section 63 is contiguous to the constricted section. At the other side of the constricted section from the relieved section, the die part has a raised ring 64 with the shape of the desired under surface of the completed head, including the fillet.

A second die part 65 with a flat-bottomed cavity 66 is brought down upon the intermediate stage configuration which forces the shank into the throat, and thereby reduces its diameter to the desired diameter. Because the die part also forms the umbrella head, no step or other discontinuity occurs. This technique thus carries out the second and third steps of the process of the invention without transfer or other handling between the steps. A completed fastener 67 is shown in FIG. 4, which resulted from carrying out the second step reduction of shank diameter and the third step reheading with die parts 60 and 65.

The limitations of the prior art may be understood from FIG. 5 which shows a fastener 45 according to the prior art which is formed by a single heading operation. Fastener heads of this type are well known and continue to be popularly used despite the inherent inaccuracies in shank diameter. However, this device when manufactured according to the invention, may be expected to have wider usage.

In making fastener 45 by techniques of the prior art, shank 46 was grasped in a header having a die substantially similar to die part 31, and was headed in a single operation to make the umbrella face 47 and head 48 by a single heading operation. It will be seen that shank portion 49 which is overhung by the umbrella face, cannot be reached by a grinder, and accordingly, should the shank be ground to size, a step would be formed at about point 50 which would create undesirable stress concentrations.

In addition to providing the advantages enumerated above relating to an accurately dimensioned cylindrical shank, this device, by virtue of the third-step reheading operation common to the techniques shown in both FIGS. 3 and 4, is given a certain amount of cold working. The use of a cold-worked fastener in a joint tends to create a fatigue-proof joint. It appears that the residual forces in cold worked surfaces such as the fillet and face in the fasteners of FIGS. 3 and 4, tend to resist fatigue forces better than surfaces which are not cold-worked, and a more reliable joint can be obtained with its use. This is merely one additional advantage of a fastener produced by the process of this invention. The reheading operations shown in FIGS. 3 and 4, which form the surfaces which are most affected by fatigue forces, have been found in practice to make a fastener which provides a joint that is more resistant to fatigue forces than those formed by fasteners, such as shown in FIG. 5, which are produced in a single-heading operation.

It will be further recognized that in the first heading step, the best practice will be to make a face which does not overhang the shank. However, should it be preferred for some reason, an overhanging face could be made, and the grinder or other turning means would then grind the face flat when turning down the cylindrical portion and fillet portion of the shank. The intermediate member to be reheaded would then look like the member that was produced by grinding the shank of the intermediate member of FIG. 1, as previously disclosed.

This invention is not to be limited by the embodiments shown in the drawings and described in the description which are given by way of example and not of limitation, but only in accordance with the scope of the appended claim.

I claim:

A process for making a fastener with a central axis, which fastener has a cylindrical shank and a head that includes a face which at least partially overhangs the shank and a cylindrical wall on the periphery of the head at the edge thereof which is closest to the face, said process comprising the steps of: (1) forming a unitary member which includes a shank and a head with a first face adjacent to the shank and perpendicular to the central axis thereof and a second central planar face on the other side of said head, the outer periphery of said planar face merging into a raised ring portion; (2) reducing the shank to a desired dimension; (3) supporting said blank at the first face only thereof adjacent the shank; (4) simultaneously confining the cylindrical wall of said head to prevent lateral deformation thereof and applying axial pressure to said raised ring portion to axially displace the outer periphery of said head beyond the portion of the first face adjacent the shank to form an overhanging portion without altering the shank; and (5) terminating such axial pressure substantially at the plane of said second face.

References Cited in the file of this patent

UNITED STATES PATENTS

| | | |
|---|---|---|
| 1,003,657 | Robertson | Sept. 19, 1911 |
| 1,551,631 | Bartlett et al. | Sept. 1, 1925 |
| 2,024,070 | Sharp | Dec. 10, 1935 |
| 2,542,023 | Friedman | Feb. 20, 1951 |
| 2,565,665 | Riech | Aug. 28, 1951 |
| 2,636,194 | Schneider | Apr. 28, 1953 |
| 2,799,027 | Hatebur | July 16, 1957 |

FOREIGN PATENTS

| | | |
|---|---|---|
| 705,613 | France | Mar. 16, 1931 |